United States Patent
Nakamura

(10) Patent No.: US 10,020,022 B2
(45) Date of Patent: Jul. 10, 2018

(54) MULTITRACK RECORDING SYSTEM WITH WIRELESS LAN FUNCTION

(71) Applicant: TEAC Corporation, Tokyo (JP)

(72) Inventor: Susumu Nakamura, Kanagawa-ken (JP)

(73) Assignee: TEAC CORPORATION, Tokyo (JP)

(*) Notice: Subject to any disclaimer, the term of this patent is extended or adjusted under 35 U.S.C. 154(b) by 80 days.

(21) Appl. No.: 14/974,448

(22) Filed: Dec. 18, 2015

(65) Prior Publication Data

US 2016/0180880 A1    Jun. 23, 2016

(30) Foreign Application Priority Data

Dec. 19, 2014  (JP) .................................. 2014-257848

(51) Int. Cl.
*G06F 17/00* (2006.01)
*G11B 20/10* (2006.01)

(52) U.S. Cl.
CPC ............... *G11B 20/10527* (2013.01); *G11B 2020/10546* (2013.01)

(58) Field of Classification Search
CPC .............. G11B 20/10527; G11B 2020/10546
USPC .......................................................... 700/94
See application file for complete search history.

(56) References Cited

U.S. PATENT DOCUMENTS

| | | | | |
|---|---|---|---|---|
| 8,301,076 B2* | 10/2012 | Grandinetti | .......... | G10H 1/0083 381/119 |
| 8,525,012 B1* | 9/2013 | Yang | ........................ | G10H 1/08 700/94 |
| 8,874,621 B1* | 10/2014 | Goodwin | .......... | G06F 17/30292 707/756 |
| 9,094,636 B1* | 7/2015 | Sanders | ............... | H04N 5/4403 |
| 9,111,519 B1* | 8/2015 | Yang | ........................ | G10H 1/40 |
| 2004/0237115 A1 | 11/2004 | Horiuchi et al. | | |
| 2008/0045140 A1* | 2/2008 | Korhonen | .......... | H04M 1/7253 455/3.06 |
| 2008/0077261 A1* | 3/2008 | Baudino | ............... | H04H 20/63 700/94 |
| 2008/0249644 A1* | 10/2008 | Jehan | ................... | G11B 27/038 700/94 |
| 2010/0179673 A1 | 7/2010 | Muroi | | |
| 2010/0217414 A1 | 8/2010 | Sanders et al. | | |

(Continued)

FOREIGN PATENT DOCUMENTS

| | | |
|---|---|---|
| CN | 103597543 A | 2/2014 |
| JP | 2001351366 A | 12/2001 |

(Continued)

*Primary Examiner* — Paul McCord
(74) *Attorney, Agent, or Firm* — Seed Intellectual Property Law Group LLP

(57) ABSTRACT

A multitrack recording system is disclosed. A multitrack recording/reproducing apparatus records a first audio signal with a multitrack recording apparatus into any of a plurality of channels (tracks). In the meantime, a smartphone records a second audio signal as a sound record file into a recording medium. A Wi-Fi connection is established between the sound recording apparatus and the smartphone, and the sound record file is transferred from the smartphone to the recording/reproducing apparatus. The recording/reproducing apparatus stores the sound record file into a remaining channel where the first audio signal is not recorded among the plurality of channels.

5 Claims, 3 Drawing Sheets

(56) References Cited

U.S. PATENT DOCUMENTS

2014/0002678 A1* 1/2014 Kuwata ............. H04N 1/00236
                                                          348/207.1
2014/0037111 A1   2/2014 Uhle et al.
2014/0254820 A1* 9/2014 Gardenfors ............ H04R 3/005
                                                          381/80

FOREIGN PATENT DOCUMENTS

| JP | 2002-258895 A | 9/2002 |
| JP | 2004-343600 A | 12/2004 |
| JP | 2010-165403 A | 7/2010 |
| WO | 2004/006209 A1 | 1/2004 |

* cited by examiner

MULTITRACK RECORDING SYSTEM WITH WIRELESS LAN FUNCTION

PRIORITY INFORMATION

This application claims priority to Japanese Patent Application No. 2014-257848 filed on Dec. 19, 2014, which is incorporated herein by reference in its entirety.

FIELD

The present invention relates to a recording system and, more particularly, to a multitrack recording system with a wireless LAN function.

BACKGROUND

When a multitrack recording apparatus is made up of a portable recorder, the number of channels which can be loaded in the multitrack recording apparatus is limited by the size of a housing. A two-channel multitrack recording apparatus or a four-channel multitrack recording apparatus has hitherto been said to be realistic.

When the number of channels of the multitrack recording apparatus is increased, a hitherto-known method is to synchronize the plurality of tracks by connecting them with a cable. However, to this end, a plurality of multitrack recording apparatus of the same type must be prepared. Since the multitrack recording apparatus are generally, comparatively expensive, cost performance is low, and therefore the multitrack recording apparatus have not yet become prevalent.

It is mentioned in JP 2001-351366 A to connect a plurality of audio recorders by way of a serial transmission interface and to set one master recorder, thereby synchronizing operation of another slave recorder to operation of the master recorder.

It is mentioned in JP 2010-165403 A to connect two multitrack recording apparatus with each other by way of a USB cable and to exchange a packaged control message, thereby enabling performance of synchronized sound-recording operation.

All of these related-art techniques are intended to connect a plurality of recorders or multitrack recording apparatus with cables. Since the techniques are based on the premise of the plurality of recorders of the same type, the foregoing problems reside in the techniques.

In the meantime, the reality is that smartphones have recently become pervasive and that many users capture still images and moving images or record sounds with the smartphones.

SUMMARY

The present invention provides a multitrack recording system that utilizes portable devices that are already widely spread, such as smartphones, but still remains simple and superior in cost performance.

A multitrack recording system with a wireless LAN function of the present invention is made up of a multitrack recording apparatus with a wireless LAN function and a portable device. The multitrack recording apparatus includes a first wireless LAN module, a first input section for inputting an audio signal, and a first processing section configured so as to record the audio signal input from the first input section into any of a first channel made up of a plurality of channels. The portable device includes a second wireless LAN module, a second input section for inputting the audio signal, and a second processing section configured so as to record the audio signal input from the second section input into any of a second channel made up of one or a plurality of channels. When the portable device and the multitrack recording apparatus are wirelessly connected by way of the first wireless LAN module and the second wireless LAN module, the first processing section and the second processing section record the audio signal input from the first input section or the second input section into any channel of a channel group made up of the first channel and the second channel.

In one embodiment of the present invention, when the portable device and the multitrack recording apparatus are wirelessly connected by way of the first wireless LAN module and the second wireless LAN module, the first processing section wirelessly receives the audio signal and records the audio signal into the first channel.

In another embodiment of the present invention, when the portable device and the multitrack recording apparatus are wirelessly connected by way of the first wireless LAN module and the second wireless LAN module, the first processing section displays on a display section of the multitrack recording apparatus a status of recording on the first channel and also displays on the display section the state of recording on the second channels that is received from the portable device.

In still another embodiment of the present invention, when the portable device and the multitrack recording system are wirelessly connected by way of the first wireless LAN module and the second wireless LAN module, the second processing section displays on a display of the portable device a status of recording on the second channel and also displays on the display section the state of recording on the first channels that is received from the multitrack recording apparatus.

In the present invention, the potable device is a smartphone.

According to the present invention, the portable device can be realized by, for instance, a smartphone.

According to the present invention, there is embodied multitrack recording that utilizes a portable device that is already widely spread, such as a smartphone, but still remains simple and superior in cost performance.

The invention will be more clearly comprehended by reference to the embodiment provided below. However, the embodiment provided below is illustrative, and the scope of the invention is not limited to the embodiment.

BRIEF DESCRIPTION OF THE DRAWINGS

A preferred embodiment of the present invention will be described in detail by reference to the following drawings, wherein.

DETAILED DESCRIPTION

An embodiment of the present invention is hereunder described by taking a portable recording/reproducing apparatus as an example. However, the following embodiment is illustrative, and the embodiment does not confine the present invention. Further, a reproducing function is not indispensable for the present invention.

Figure 1:
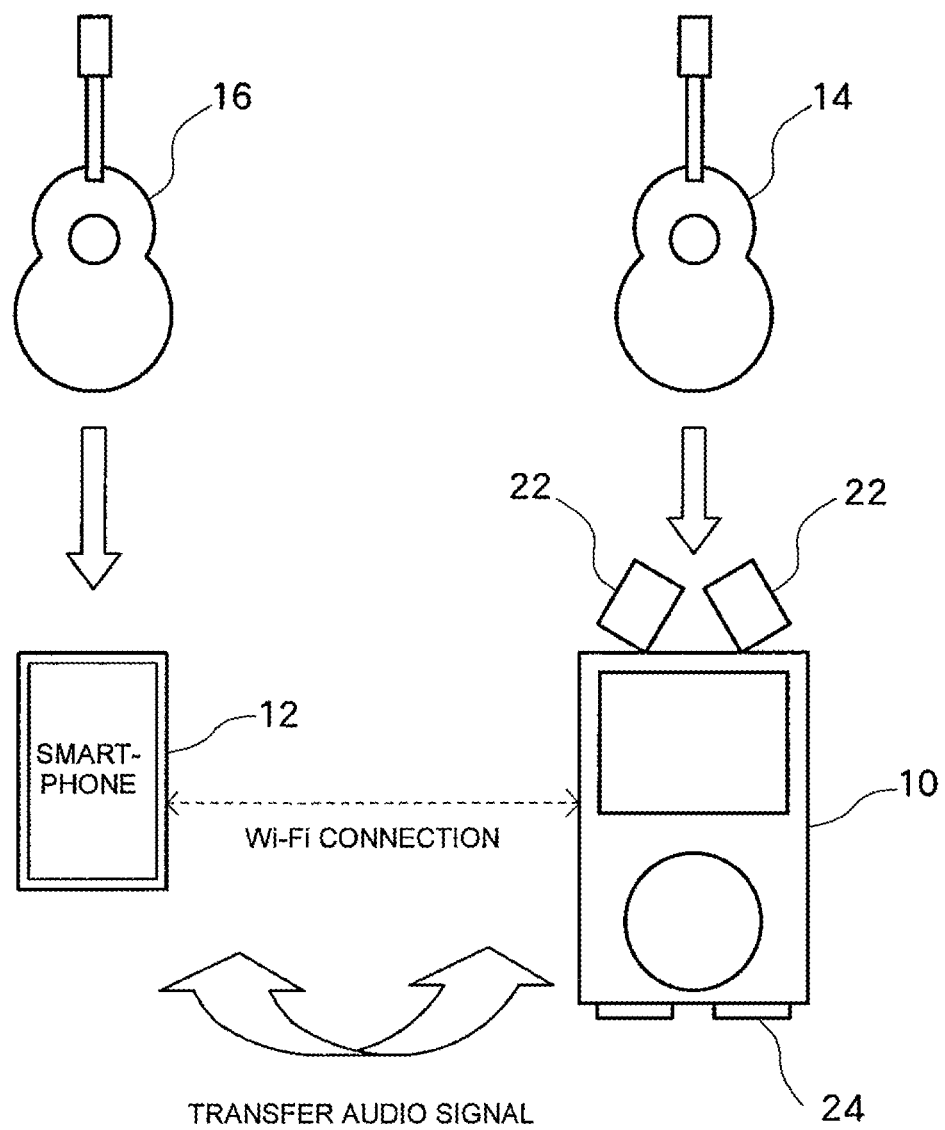
FIG. 1 is a system configuration diagram of an embodiment.

FIG. 1 is a system configuration diagram of the present embodiment. The portable recording/reproducing apparatus (hereinbelow referred to simply as a "recording/reproducing apparatus") 10 is wirelessly connected to a portable device with a wireless connection function. In the present embodiment, a smartphone 12 is exemplified as a portable device with a wireless connection function, and a wireless LAN; more specifically, a Wi-Fi connection, is exemplified as a wireless connection. Smartphones with Wi-Fi modules have already been known and can connect with the Internet via an access point, such as a wireless router.

The recording/reproducing apparatus 10 has a known recording/reproducing function and processes an audio signal input from a built-in microphone 22 and a line input terminal 24; records the processed audio signal into an SD card, and the like; reproduces the audio signal recorded in the SD card; and outputs it from a built-in speaker. In addition, the recording/reproducing apparatus 10 has a Wi-Fi module and establishes a Wi-Fi connection with the smartphone 12. The Wi-Fi connection between the recording/reproducing apparatus 10 and the smartphone 12 is basically a one-to-one connection; however, the connection may also be a one-to-many connection when necessary. The recording/reproducing apparatus 10 can act as a multitrack recording apparatus with a plurality of channels and record an audio signal by selecting an arbitrary channel from among a plurality of channels.

A user of the recording/reproducing apparatus 10 inputs an audio signal generated by playing a desired musical part or an audio signal generated by performance, such as live performance, of a band by way of the built-in microphone 22 or the line input terminal 24 of the recording/reproducing apparatus 10, thereby recording sounds. FIG. 1 illustrates a part of a musical instrument 14, like a guitar, as a desired musical part. The musical part may also be an arbitrary part other than the guitar part; for instance, a base part, a vocal part, and a drum part. The recording/reproducing apparatus 10 inputs the audio signal and records the same in any of a plurality of channels. The audio signal recorded in the recording/reproducing apparatus 10 is referred to as a first audio signal.

In the meantime, the smartphone 12 has a Wi-Fi module and establishes a Wi-Fi connection with the recording/reproducing apparatus 10. The smartphone 12 has a known imaging function and a known recording function; processes an audio signal input from a built-in microphone or an external microphone; and records the audio signal on a recording medium. For instance, the smartphone 12 records the audio signal of a musical instrument 14. Like the recording/reproducing apparatus 10, the smartphone 12 can record an arbitrary part. The user initiates a predetermined application (an application required to work in cooperation with and control the recording/reproducing apparatus 10) and controls operation of the recording/reproducing apparatus 10; namely, a record start, a record stop, a playback start, and a playback stop, by operating the application. The audio signal to be recorded in the smartphone 12 is referred to as a second audio signal.

When the recording/reproducing apparatus 10 and the smartphone 12 are wirelessly connected, the audio signal can be exchanged between the recording/reproducing apparatus 10 and the smartphone 12. Accordingly, the audio signal input from the built-in microphone 22 or the line input terminal 24 of the recording/reproducing apparatus 10 can be recorded on each of the channels of the recording/reproducing apparatus 10. Further, the audio signal can also be wirelessly transmitted from the recording/reproducing apparatus 10 to the smartphone 12 and recorded on the channel of the smartphone 12. In this case, the number of channels of the recording/reproducing apparatus 10 are substantially increased by the channels of the smartphone 12.

Likewise, the audio signal input from the built-in microphone or the line input terminal of the smartphone 12 can be recorded on each channel of the smartphone 12. Moreover, the audio signal can also be wirelessly transmitted from the smartphone 12 to the recording/reproducing apparatus 10 and recorded on each of the channels of the recording/reproducing apparatus 10. Even in this case, the number of channels of the recording/reproducing apparatus 10 becomes substantially increased by virtue of the channel of the smartphone 12 while the number of channels of the recording/reproducing apparatus 10 is taken as a reference.

The plurality of channels that the recording/reproducing apparatus 10 has and the single or plurality of channels that the smartphone 12 has are hereinafter collectively called a channel group of a sound recording system.

Specifically, channel group of the sound recording system= a plurality of channels of the recording/reproducing apparatus 10+ a channel of the smartphone 12.

Provided that the plurality of channels of the recording/reproducing apparatus 10 are taken as a "first channel" and that a channel of the smartphone 12 is taken as a "second channel," the channel group of the sound recording system can be said to be made up of the first channel and the second channel. The first channels and the second channels can be said to be connected seamlessly by the Wi-Fi connection. When the recording/reproducing apparatus 10 has a four-channel track and when a two-channel virtual track is set in the smartphone 12, a six-channel multitrack recording apparatus can be said to be made up of the recording/reproducing apparatus 10 and the smartphone 12 by means of the wireless connection. When the recording/reproducing apparatus 10 is set to a master, the recording/reproducing apparatus 10 ascertains its own four channels as the first channel to the fourth channel and the smartphone 12 as the fifth channel and the sixth channel. Meanwhile, when the smartphone 12 is set to the master, the smartphone 12 ascertains its own two channels as the first to second channels and the four channels of the recording/reproducing apparatus 10 as the third to sixth channels. However, no problem will arise even when the recording/reproducing apparatus 10 is prioritized, the four channels of the recording/reproducing apparatus 10 are recognized as the first to fourth channels and when the two channels of the smartphone are recognized as the fifth to sixth channels. The number of channels (the channel group) can be changed as required according to specifications.

Either the recording/reproducing apparatus 10 or the smartphone 12 can arbitrarily set which channel of the channel group of the sound recording system is used for recording the audio signal input to the recording/reproducing apparatus 10 is or which channel of the channel group of the sound recording system is used for recording the audio signal input to the smartphone 12. For instance, settings are made such that the user records the audio signal input from the recording/reproducing apparatus 10 into two channels of the recording/reproducing apparatus 10 and also records the audio signal into the channel of the smartphone 12 by operating the recording/reproducing apparatus 10, or that the user records the audio signal input from the smartphone 12 only into the channels of the recording/reproducing apparatus 10 by operating the smartphone 12.

Even in the case of mixing-down operation subsequent to recording, an arbitrary channel of the channel group of the sound recording system can be used in the same manner as that employed at the time of recording. For instance, in the recording/reproducing apparatus 10, an audio signal pertaining to the guitar is recorded on the first channel; an audio signal pertaining to the drum is recorded on the second channel; and an audio pertaining to vocals is recorded on the third channel. Subsequently, the audio signals can also be mixed down and stored in remaining channels of the recording/reproducing apparatus 10 or the channel of the smartphone 12.

When the recording/reproducing apparatus 10 and the smartphone 12 are not wirelessly connected, the first audio signal is independently recorded on each channel of the recording/reproducing apparatus 10. The second audio signal is also independently recorded on each of the channels of the smartphone 12. However, when the recording/reproducing apparatus 10 and the smartphone 12 are wirelessly connected, status information about a recording status is wirelessly transmitted from the smartphone 12 to the recording/reproducing apparatus 10. In addition to monitoring its own recording status, the recording/reproducing apparatus 10 also acquires a recording status of the smartphone 12, collectively displaying the pieces of status information on a display, and the like. As a matter of course, the status information about the recording status is wirelessly transmitted from the recording/reproducing apparatus 10 to the smartphone 12, and the smartphone 12 monitors its own recording status. However, in addition, the recording status of the recording/reproducing apparatus 10 can also be acquired and collectively displayed on the display, or the like. In short, the essential requirement is that either the recording/reproducing apparatus 10 or the smartphone 12 should collectively monitor the recording status of the channel group of the sound recording system. Moreover, it is also preferable to display, on the display, whether a recording source of each of the channels making up the channel group is the recording/reproducing apparatus 10 or the smartphone 12.

The present embodiment is for substantially increasing the number of channels of the recording/reproducing apparatus 10 by letting the recording/reproducing apparatus 10 and the smartphone 12 operate in cooperation with each other through the Wi-Fi connection. One of advantages of the embodiment is that, in spite of the user of the recording/reproducing apparatus 10 and the user of the smartphone 12 recording respective audio signals at different locations and at different times, the single recording/reproducing apparatus 10 can record the audio signals in the form of multitracks. For instance, a user A of the recording/reproducing apparatus A records guitar sound on the first channel and drum sound on the second channel in a studio. Further, a user B of the smartphone 12 can record vocals in the channel of the smartphone 12 at home; wirelessly transmit the vocals to the recording/reproducing apparatus 10 by way of the Wi-Fi connection; and store the received vocals on an empty channel of the recording/reproducing apparatus 10. Moreover, in this case, the guitar of the first channel, the drum of the second channel, and the vocals of the third channel can also be mixed down and stored in the fourth channel of the recording/reproducing apparatus 10 or an empty channel of the smartphone 12.

Figure 2:
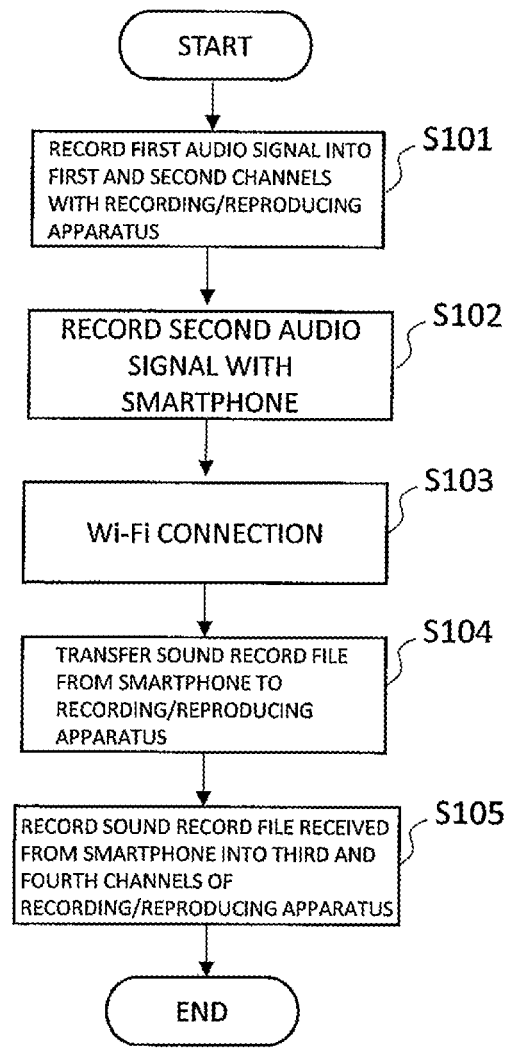
FIG. 2 is a processing flowchart of the present embodiment.

FIG. 2 is a processing flowchart of the present embodiment. By way of example, there is provided a flowchart to be employed when the first audio signal is recorded on the first channel and the second channel of the recording/reproducing apparatus 10; when the smartphone 12 records the second audio signal; and when the second audio signal is recorded on the third channel and the fourth channel of the recording/reproducing apparatus 10 by being wirelessly transmitted from the smartphone 12 to the recording/reproducing apparatus 10.

First, the recording/reproducing apparatus 10 records the first audio signal into the first channel and the second channel (S101). Specifically, a sound record level, a sound record format, a sampling frequency, and various filter processing are set. The first audio signal is then processed and recorded on the first channel and the second channel of the recording medium, such as an SD card.

Before or after S101, the smartphone 12 records the second audio signal (S102). Recording conditions employed at this time do not need to be identical with those of the recording/reproducing apparatus 10. The smartphone 12 records a sound record file of the second audio signal into the recording medium, such as an SD card.

Next, a Wi-Fi connection is established between the recording/reproducing apparatus 10 and the smartphone 12 (S103). Specifically, the Wi-Fi module is activated by operating a Wi-Fi button or icon of the recording/reproducing apparatus 10. A Wi-Fi button on the smartphone 12 is then operated to activate the Wi-Fi module. When the smartphone 12 detects the recording/reproducing apparatus 10 and when an SSID, which is an ID of an access point in the wireless LAN of the recording/reproducing apparatus 10, is displayed, a password corresponding to the SSID is input to establish a Wi-Fi connection. The password can also be displayed on the display section of the recording/reproducing apparatus 10 to prompt the user to visually confirm the password.

When the Wi-Fi connection is established, the smartphone 12 reads the sound record file designated by the user and transfers the thus-read sound record file to the recording/reproducing apparatus 10 (S104). Alternatively, a predetermined application installed in the smartphone 12 can also read the sound record file in response to a request command from the recording/reproducing apparatus 10 and transfer the file to the recording/reproducing apparatus 10.

Finally, the recording/reproducing apparatus 10 receives the sound record file transmitted from the smartphone 12 and records the sound record file into the third channel and the fourth channel that are remaining channels other than the first channel and the second channel where the first audio signal is recorded (S105). So long as the sound record file; in other words, the second audio signal, is a single-channel signal, the signal can also be stored in either the third channel or the fourth channel. If the second audio signal is made up of stereo channels including an L channel and an R channel, an L-channel signal is stored in the third channel, and an R-channel signal is stored in the fourth channel.

Incidentally, when the recording/reproducing apparatus 10 reproduces sound record files in the first to fourth channels, it is also preferable for the user to be able to easily ascertain whether or not the sound record file is recoded by the recording/reproducing apparatus 10 or the sound record file is once recorded by the smartphone 12 and transmitted from the smartphone 12, by visually confirming the name of the file. For instance, a specific flag is added to the name of the sound record file received from the smartphone 12. When a sound recording format of the recording/reproducing apparatus 10 and a sound recording format of the smartphone 12 are different from each other, the sound record file can be easily identified by a difference in format.

A specific configuration of the recording/reproducing apparatus 10 of the present embodiment is now described.

Figure 3:
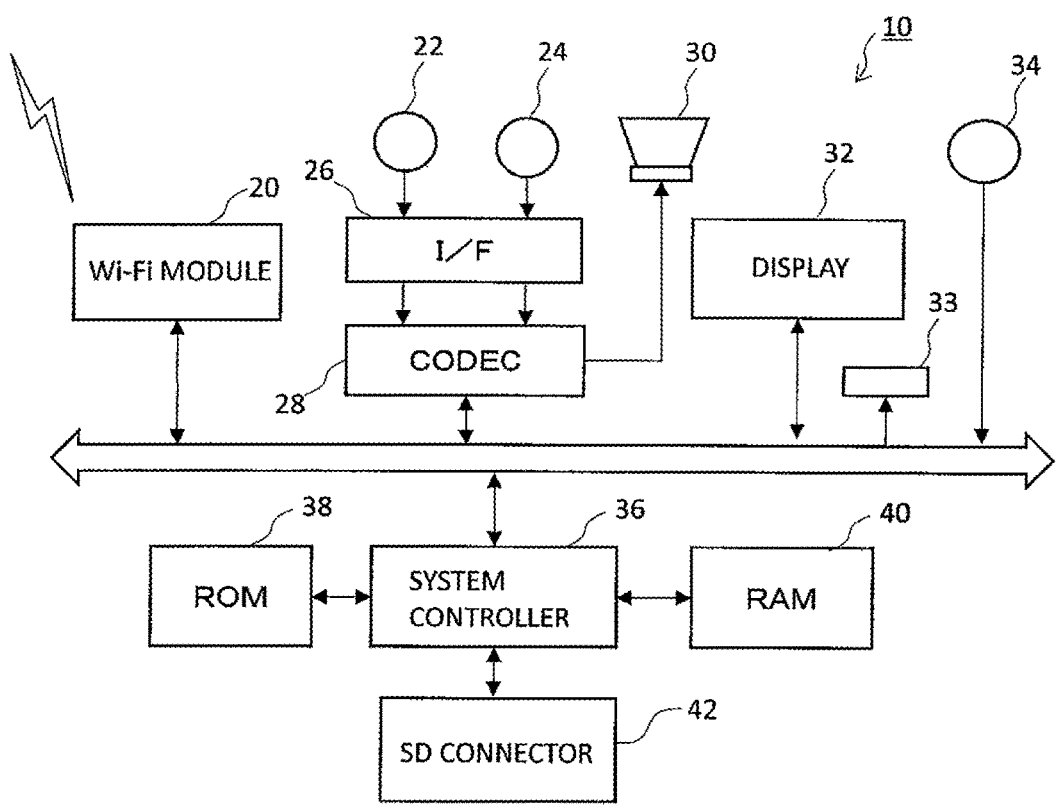
FIG. 3 is a configuration block diagram of a recording/reproducing apparatus of the present embodiment.

FIG. 3 is a configuration block diagram of the recording/reproducing apparatus 10 of the present embodiment. The recording/reproducing apparatus 10 has a Wi-Fi module 20; the built-in microphone 22, the line input terminal 24, a built-in speaker 30, a display 32, an LED 33, operation buttons 34, a system controller 36, and an SD connector 42.

The Wi-Fi module 20 is a wireless LAN module that establishes a Wi-Fi connection with and exchanges data with the smartphone 12. The Wi-Fi module 20 starts up in response to activation of the operation buttons 34, thereby establishing the Wi-Fi connection with the smartphone 12. In addition, the Wi-Fi module 20 receives a command from the smartphone 12, supplying the received command to the system controller 36. The command is one for controlling operation of the recording/reproducing apparatus 10; for instance, a record start, a record stop, and others. Further, the Wi-Fi module 20 transmits the status information supplied from the system controller 36 to the smartphone 12. The status information includes sound recording conditions of a plurality of channels; for instance, the first channel and the second channel are already recorded, and the third channel and the fourth channel are unrecorded.

The built-in microphone 22 is a stereo microphone having the R channel and the L channel, inputs an audio signal generated by playing the musical instrument, and the like, and outputs the audio signal to an interface (I/F) 26.

The line input terminal 24 inputs the audio signal from an external device (including an external microphone) by way of a line input, outputting the audio signal to the interface (I/F) 26.

The interface (I/F) 26 outputs the audio signal from the built-in microphone 22 or the line input terminal 24 to a codec (CODEC) 28.

The codec (CODEC) 28 converts the input audio signal into a digital signal, compresses and encodes the signal, and outputs the audio signal to the system controller 36. In addition, the codec 28 expands and decodes the audio signal supplied from the system controller 36 and converts the thus-decoded signal into an analog audio signal, outputting the analog audio signal from the built-in speaker 30. The codec (CODEC) 28 can also be separated into a module for processing the audio signal from the built-in microphone 22 or the line input terminal 24 and another module for processing the audio signal to be output to the built-in speaker 30.

The display 32 is built from an LCD panel, an organic EL panel, and the like, and displays various types of status information about the recording/reproducing apparatus 10; for instance, a record/playback time counter and a sound record level.

The LED 33 shows a start status and a connection status of the Wi-Fi module 20. When the Wi-Fi module 20 is OFF, the LED 33 stays extinguished. When the Wi-Fi module 20 is ON, the LED 33 stays blinking (standby state). When the Wi-Fi module 20 is ON and when the Wi-Fi connection is maintained, the LED 33 shifts to an illuminated state.

The operation buttons 34 are for instructing operation of the recording/reproducing apparatus 10. The operation buttons 34 include a Wi-Fi button for switching the Wi-Fi between ON and OFF, a recording/playback/stop button, a sound record level adjustment button, a channel (track) selection button, and others. The operation buttons 34 can also be configured as a jog dial or touch buttons on the display 32.

The system controller 36 is made up of a processor and memory, and controls respective sections of the recording/reproducing apparatus 10. In accordance with the processing program recorded in the ROM 38, the system controller 36 performs various kinds of processing by using RAM 40 as working memory. Various types of processing include activating/deactivating the Wi-Fi module 20, establishing the connection with the smartphone 12, processing the audio signal input from the built-in microphone 22 or the line input terminal 24, recording the audio signal into the SD card, reproducing the audio signal, supplying status information to the Wi-Fi module 20, exchanging the audio signal with the smartphone 12 by way of the Wi-Fi module 20, and recording the audio signal into the SD card, and others. The system controller 36 can also have a plurality of processors or work in cooperation with a PLD (programmable logic device).

The SD card is inserted into the SD connector 42. The system controller 36 performs sound recording by recording the audio signal into the SD card. Moreover, the audio signal recorded in the SD card is read and output from the built-in speaker 30 by way of the codec (CODEC) 28.

In response to operation of the operation buttons 34 or a command received from the smartphone 12, the system controller 36 records the audio signal input from the built-in microphone 22 or the line input terminal 24 into any of the channel groups of the sound recording system. For instance, when the first channel and the second channel of the recording/reproducing apparatus 10 and the first channel of the smartphone 12 are set with the operation buttons 34, the system controller 36 records the input audio signal into the first channel and the second channel, wirelessly transmitting the command and the audio signal to the smartphone 12. In response to the command from the recording/reproducing apparatus 10, the controller of the smartphone 12 records the received audio signal into the first channel of the smartphone 12. The controller of the smartphone 12 wirelessly transmits the status information, including the recording status, to the recording/reproducing apparatus 10. The system controller 36 receives the status information from the smartphone 12, collectively displaying the status information on the display 32 along with the recording status of the system controller 36. Moreover, when receiving from the command and the audio signal from the smartphone 12, the system controller 36 records the received audio signal, in response to the command, into the channel designated by the command. At this time the system controller 36 wirelessly transits the status information, including the recording status, to the smartphone 12.

Further, the system controller 36 can also search for a channel where the first audio signal is not recorded among the channels of the system controller 36 and automatically store the second audio signal received from the smartphone 12 into an empty channel. As a consequence, for instance, the following are stored;

First channel: 141203-000.wav,
Second channel: 141203-001.wav, and
Third channel] 141205-S.mp3.

The end of the file name of the third channel, or "-S," denotes a file transmitted from the smartphone 12.

The configuration of the smartphone 12 is known and unillustrated. However, the smartphone 12 also has a wireless LAN module, a built-in microphone for inputting a second audio signal, and a controller for processing and recording the second audio signal. The sound recording system of the present embodiment can be said to perform control such that the system controller 36 of the recording/reproducing apparatus 10 and the controller of the smartphone 12 work in cooperation with each other, configuring the channel groups of the sound recording system as if to make up a plurality of channels in a single sound recorder. In order to distinguish the configures from each other, the wireless LAN module 20, the built-in microphone 22, the line input terminal 24, and the system controller 36 of the recording/reproducing apparatus 10 are referred to as a first wireless LAN module, first input means, and first processing means. Meanwhile, the wireless LAN module, the built-in microphone, and the controller of the smartphone 12 are referred to as a second wireless LAN module, second input means, and second processing means.

Although the embodiment of the present invention has been described thus far, the present invention is not limited to the embodiment and susceptible to various modifications.

For instance, in the present embodiment, the plurality of smartphones can also transmit mutually-different sound record files to the recording/reproducing apparatus 10. For instance, a plurality of smartphones are taken as a smartphone A and a smartphone B, and sound record files of the respective smartphones are taken as a sound record file A and a sound record file B. In this case, the sound record file A is stored in the third channel of the recording/reproducing apparatus 10, and the sound record file B is stored in the fourth channel of the recording/reproducing apparatus 10.

Moreover, in the present embodiment, control of reading/write and mixing-down of the audio signals recorded in the channel group of the sound recording system is basically performed in response to user's operation of the operation buttons and the icon of the recording/reproducing apparatus 10 or the smartphone 12. Operation settings for the time of wireless connection can also be changed on the menu screen, and items desired to be automatically performed can also be automatically performed after being set to ON. Thereby, when the Wi-Fi connection is established between the recording/reproducing apparatus 10 and the smartphone 12, the system controller 36; for instance, can also automatically transmit a command for requesting a sound record file to the controller of the smartphone 12, and the sound record file transferred from the smartphone 12 can also be automatically stored on a predetermined channel.

Although the present embodiment exemplifies the Wi-Fi connection as a wireless connection, a NFC (Near Field Communication), a Bluetooth, or the like, can also be used.

The invention claimed is:

1. A multitrack recording system comprising:
a multitrack recording apparatus; and
a portable device;
wherein the multitrack recording apparatus includes:
a first wireless Local Area Network (LAN) module which, in operation, performs wireless communications,
a first input which, in operation, inputs a first audio signal, and
a first processor which, in operation, records the first audio signal input from the first input into a first channel of a first plurality of channels; and
wherein the portable device includes:
a second wireless LAN module which, in operation, performs wireless communications,
a second input which, in operation, inputs a second audio signal, and
a second processor which, in operation, records the second audio signal input from the second input into a second channel of one or more second channels;
wherein the first processor, in response to detecting that the portable device is wirelessly connected to the multitrack recording apparatus by way of the first wireless LAN module, transmits by way of the first wireless LAN module and the second wireless LAN module a command requesting a sound recording file including the second audio input from the second input,
wherein the first processor, in response to transmitting the command, receives by way of the first wireless LAN module and the second wireless LAN module the sound recording file including the second audio input from the second input, and records the second audio signal input from the second input into a second channel of the first plurality of channels, and
wherein the first processor records the sound recording file including the second audio signal input from the second input using a file name that includes a predetermined flag indicating the sound recording file was transmitted from the portable device.

2. The multitrack recording system according to claim 1, wherein the first processor receives from the second processor, by way of the first wireless LAN module and the second wireless LAN module, a command that designates the second channel of the first plurality of channels into which the first processor records the second audio signal input from the second input.

3. The multitrack recording system according to claim 1, wherein, when the portable device and the multitrack recording apparatus are wirelessly connected by way of the first wireless LAN module and the second wireless LAN module, the first processor displays on a display device of the multitrack recording apparatus status information, and wherein the status information displayed on the display device indicates that a recording source of the first channel of the first plurality of channels is the multitrack recording apparatus and indicates that a recording source of the second channel of the first plurality of channels is the portable device.

4. The multitrack recording system according to claim 1, wherein, when the portable device and the multitrack recording system are wirelessly connected by way of the first wireless LAN module and the second wireless LAN module, the second processor displays on a display device of the portable device status information, and wherein the status information displayed on the display device indicates that a recording source of the first channel of the first plurality of channels is the multitrack recording apparatus and indicates that a recording source of the second channel of the first plurality of channels is the portable device.

5. The multitrack recording system according to claim 1, wherein the portable device is a smartphone.

* * * * *